(12) United States Patent
Shepard et al.

(10) Patent No.: US 8,342,458 B2
(45) Date of Patent: Jan. 1, 2013

(54) ELECTRIC DEVICE CORD HANDLER

(76) Inventors: Daniel Robert Shepard, North Hampton, NH (US); Britta Shepard, North Hampton, NH (US)

( * ) Notice: Subject to any disclaimer, the term of this patent is extended or adjusted under 35 U.S.C. 154(b) by 0 days.

(21) Appl. No.: 12/804,126

(22) Filed: Jul. 14, 2010

(65) Prior Publication Data

US 2011/0011988 A1  Jan. 20, 2011

Related U.S. Application Data

(60) Provisional application No. 61/270,835, filed on Jul. 14, 2009.

(51) Int. Cl.
*F16L 3/00* (2006.01)

(52) U.S. Cl. .......................... 248/52; 248/51; 280/47.34

(58) Field of Classification Search .................... 248/52, 248/51; 191/12 R, 12 S; 174/69; 280/47.34; 56/10.5, 1, 17.5, 16.7; 180/2.1

See application file for complete search history.

(56) References Cited

U.S. PATENT DOCUMENTS

| | | | | | |
|---|---|---|---|---|---|
| 1,516,781 | A | * | 11/1924 | Nylen | 248/52 |
| 1,862,411 | A | * | 6/1932 | Mackenzie, Jr. | 248/52 |
| 2,079,759 | A | * | 5/1937 | Burns | 248/51 |
| 2,503,124 | A | * | 4/1950 | Morton | 248/52 |
| 2,579,062 | A | * | 12/1951 | Aab | 248/51 |
| 2,633,688 | A | * | 4/1953 | Yeck et al. | 56/10.5 |
| 3,220,678 | A | * | 11/1965 | Gunderson | 248/52 |
| 3,375,338 | A | * | 3/1968 | Delf | 200/293.1 |
| 3,586,275 | A | * | 6/1971 | Mittelstadt et al. | 248/52 |
| 3,730,612 | A | * | 5/1973 | Arroyo et al. | 359/860 |
| 4,395,053 | A | * | 7/1983 | Kalfas | 280/47.34 |
| 5,730,397 | A | * | 3/1998 | Van Niekerk | 248/52 |

* cited by examiner

*Primary Examiner* — Anita M King

(57) ABSTRACT

The present invention relates to corded electric devices and more particularly to corded electric devices that move their location such as an electric lawn mower. The present invention is a device for handling the electric cord of a device such as an electric lawn mower or some other movable platform to which electric power is provided (a lawn mower is a movable platform having a device for cutting grass such as spinning blades). The present invention manages the position of a cord as the platform on which it is mounted is moved.

18 Claims, 3 Drawing Sheets

ELECTRIC DEVICE CORD HANDLER

CROSS REFERENCE TO RELATED APPLICATIONS

The present disclosure claims priority to Provisional Patent Application 61/270,835 filed on Jul. 14, 2009 by Shepard, et. al. titled "Electric Device Cord Handler" and that application is hereby incorporated herein in its entirety.

FIELD OF THE INVENTION

The present invention relates to corded electric devices and more particularly to corded electric devices that move their location such as an electric lawn mower.

REFERENCE TO A SEQUENCE LISTING, A TABLE, OR A COMPUTER PROGRAM LISTING COMPACT DISK APPENDIX

Not Applicable.

REFERENCE REGARDING FEDERAL SPONSORSHIP

Not Applicable.

STATEMENT REGARDING FEDERALLY SPONSORED RESEARCH OR DEVELOPMENT

Not Applicable.

SUMMARY OF THE INVENTION

Movable electronic devices can have their power generated in the device (e.g., hybrid electric vehicles with gas engine and electric generator), stored in the device (e.g., toy car with batteries), or externally provided (e.g., corded garden device such as a lawn mower). In the case of the latter device example (the corded electric lawn mower), the cord is at time at risk of being cut. This makes the device at times difficult to operate as the operator must handle the cord to prevent it from being crossed over by the lawn mower and resulting in the cord being cut.

The present invention is a device for handling the electric cord of a device such as an electric lawn mower or some other movable platform to which electric power is provided (a lawn mower is a movable platform having a device for cutting grass such as spinning blades).

DESCRIPTION OF THE PREFERRED EMBODIMENT

The present invention is a means to handle the electric cord of a device such as a lawn mower. Corded electric lawn mowers are a very convenient lawn and garden tool. Unlike gas engine mowers, they do not require the user to go purchase and transport gasoline. Unlike battery powered lawn mowers, they are light weight and do not have to be left on a charger. They are also relatively quiet. Unfortunately, corded electric mowers must be carefully operated to avoid having the grass cutting blades cut the cord resulting in risk of electrical shock and destruction of expensive electric extension cords. The present invention enables operation while the operator is in the operating position (i.e., while the operator is standing behind the mower where he can push the mower forward by pushing on the handle 23 of the push bar).

Figure 1:
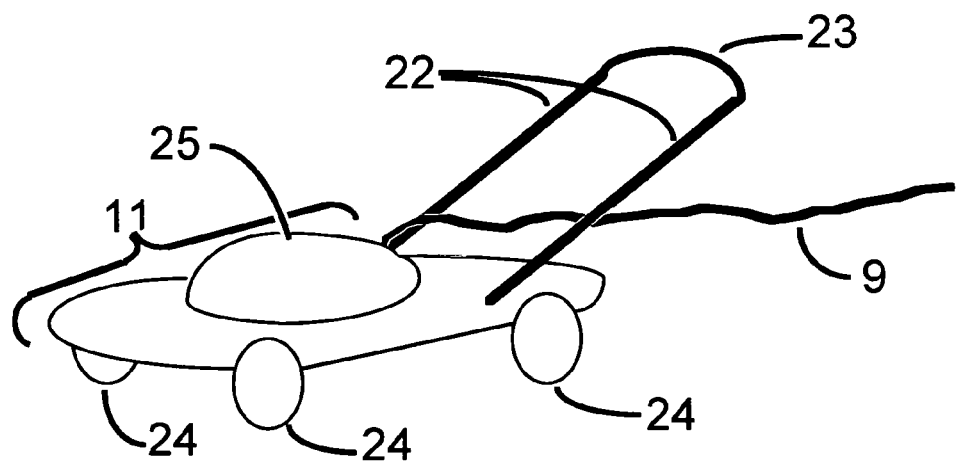
FIG. 1 depicts an electric lawn mower.

Operating a corded electric lawn mower requires that the operator regularly move the cord away from the path of the mower. This is typically done by starting the mowing at one side of the area to be cut and moving away from that side while cutting. While traveling away from that side, the operator typically travels back and forth along a path parallel to that side. As the operator pushes the mower, the cord is dragged behind the mower oriented towards the side of the initial cut. When the operator reaches one end or the other of the area being mowed, he must turn the mower around and continue in the opposite direction. This is the point of greatest cord cutting risk. In so much as the cord was dragged behind the mower in the prior pass, the cord will be very close to the edge of the last cut path when turned around. However, for good cut coverage, the cutting path going back should slightly overlap the last cut path (this is to prevent small areas of uncut grass from being left behind after mowing). This overlap requirement results in the operator having to "flip" the end of the cord in a whip-like motion to cause the cord to be moved back into the path just cut and out of the way of the next cut to be mowed. Frequently, this whip-like motion is not sufficient to move the entire length of the cord out of the way causing the operator to repeat this motion one or more times as he proceeds with the next cut. This repeated "flipping" of the cord can require the operator to reach down and pick up the cord dangerously close to the cutting blades. FIG. 1 depicts a corded electric lawn mower having an attached electric extension cord 9.

Figure 3:
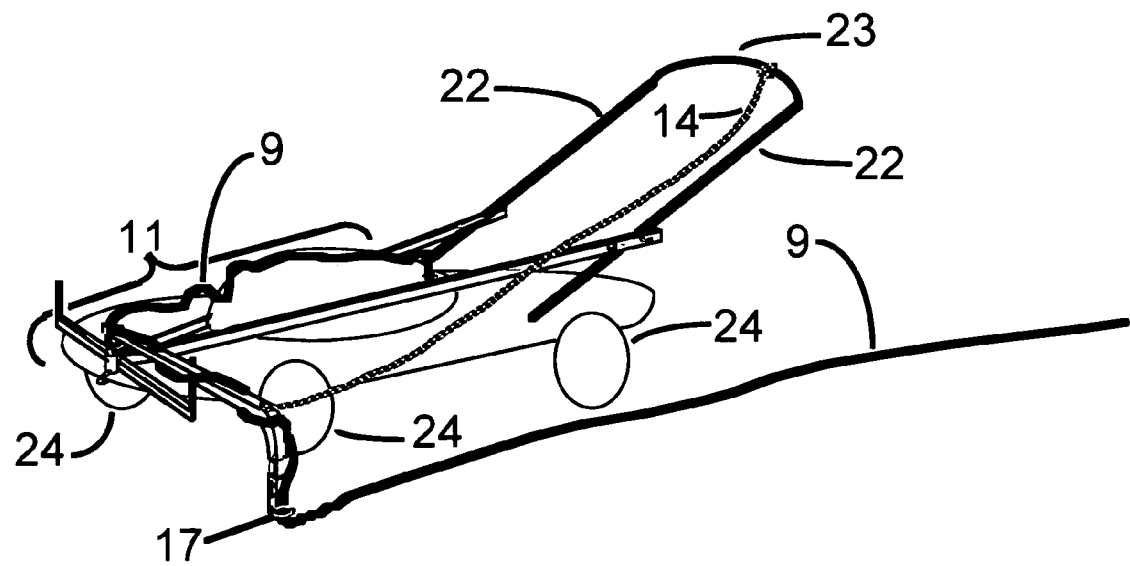
FIG. 3 depicts an embodiment of the present invention that is mounted on an electric lawn mower.
Figure 2:
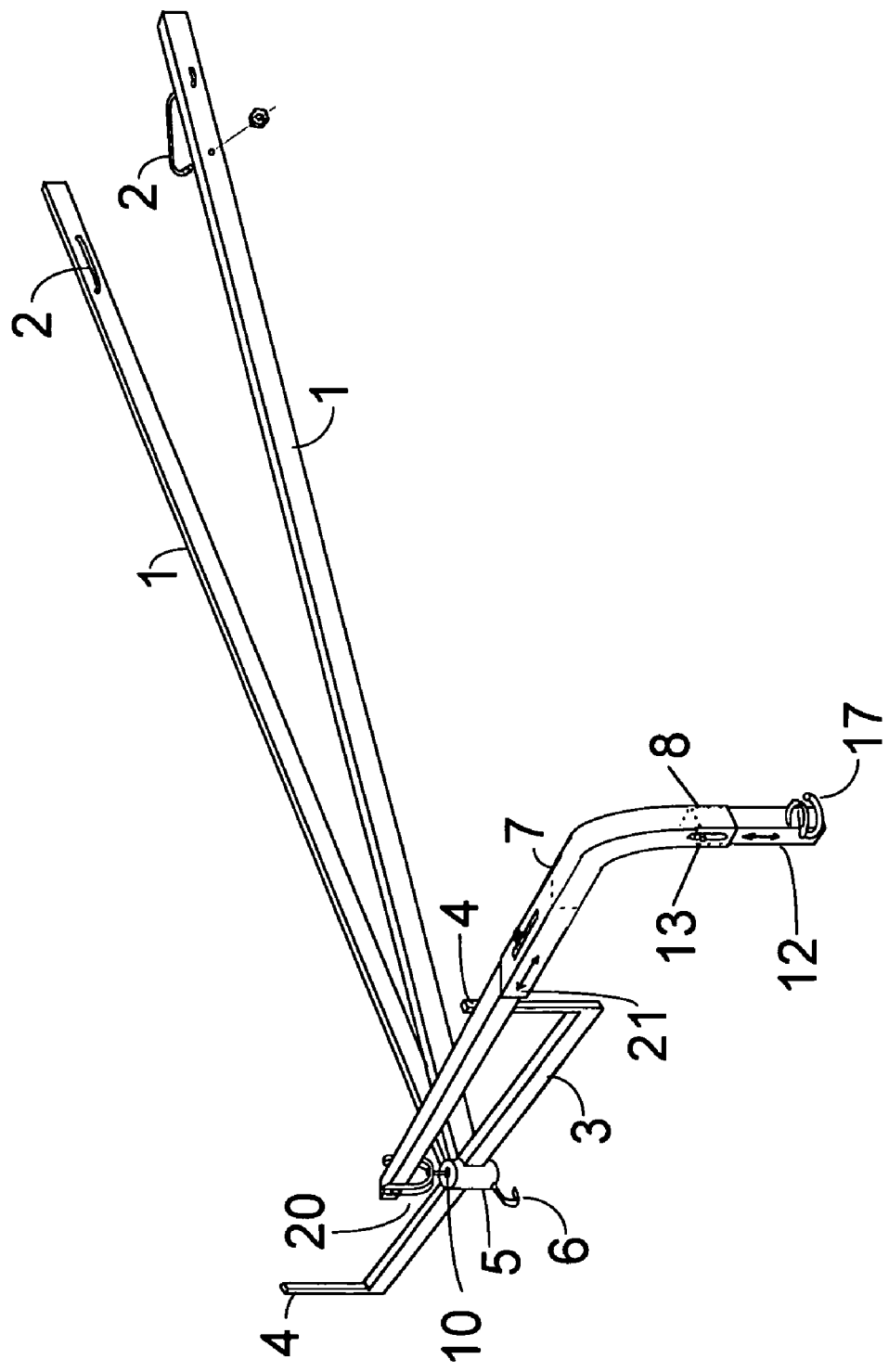
FIG. 2 depicts an embodiment of the present invention.

As depicted in FIG. 2, the preferred embodiment of the present invention is a corded lawn mower cord handling device. It consists primarily of a support arm 7 that holds the cord away from the mower while making a cut such that the cord will be to the side of the subsequent cut to be made. Also, this support arm 7 is mounted with a pivot 10 at its center support 5 such that when the operator turns the mower around, the arm can freely swing to the opposite side of the mower such that the operator does not even have to touch the cord or reach in the direction of the cutting blades. Since the cord is being dragged by the mower and cord handling device while the mower is being pushed forward, it is the friction of the cord with the ground or grass that keeps that cord in place away from the mower while being dragged. To make this ground contact, the end of support arm 7 can optionally have a drop portion 8 that comes closer to the ground so as to make that ground contact without having the cord suspended in the air for a distance behind the mower before ground contact is made. A crossbar 3 with blocking posts 4 prevents the support arm 7 from being pulled back such that its motion about the pivot would have the end of the support arm 7 swing back towards the mower behind the center support 5. The blocking posts 4 help to ensure that the cord is dragged from a point as far to the side of the mower as the support arm 7 and drop portion 8 will permit. It is anticipated that this device will be attached to existing corded electric lawn mowers and it includes a hook 6 to attach the device to the front lip of the mower as well as mounting arms 1 and clamps 2 to attach the device to the push bar of the mower (hook 6 is optional as the weight of the device can be sufficient to keep the device in position). FIG. 3 depicts an embodiment of the present invention mounted on a lawn mower showing the electrical cord 9 attached along support arm 7 and down drop portion 8. The drop down portion can be adjustable in length to facilitate different height settings for the platform 11 and the adjustment can be done manually by the operator or could be automatic (e.g., if the drop down portion incorporates a piece that slides 12, such as a rod within a drop down portion comprising a tube, the length of the drop down portion could self adjust whereby gravity will lengthen the drop down portion and bumping into the ground will shorten the drop down portion; the piece that slides should incorporate a pin 13 to prevent it from sliding all the way out and these techniques are well understood by those skilled in the art).

Figure 6:
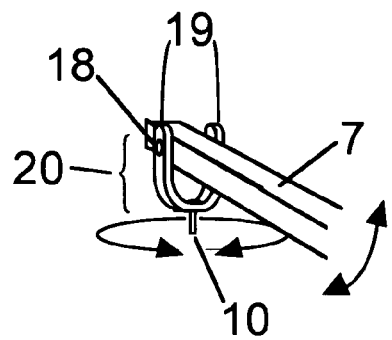
FIG. 6 depicts a mounting bracket for the support arm that can be raised and lowered as well as rotated.

A variation on the present invention would be to enable the device to be temporarily disabled by positioning the support arm over the mower such that the free end is near the bottom of the push bar (e.g., between the two vertical portions 22 of the push bar). FIG. 6 depicts a variation on the mounting bracket of the present invention in which the support arm 7 can not only be rotated, but raised and lowered as well. This type of mounting, as well as others that are functionally equivalent and understood by those skilled in the art, has a post 10 at the bottom to facilitate rotation while a pin 18 that passes through both forks 19 of the bracket 20 and the end of the support arm facilitates lifting the support arm 7 to raise and reposition it. This variation can be used to facilitate the lifting of the support arm up and over the blocking posts 4 such that it can be rested back over the top 25 of the mower. In this position, the benefit of the support arm will be defeated, however it will enable the mower to be temporarily operated as a conventional mower for cutting close to obstacles and in other places where the support arm might collide with such obstacles or otherwise interfere with the mowing operation. To facilitate lifting the support arm, a cord 14 can be attached between the support arm and the push bars of the mower (having sufficient length that it will not interfere with the normal operation of the support arm according to the present invention, but not so long that it will drag on the ground or become entangled with the blades or other moving parts); this cord can then be pulled by the operator to lift and position the support arm without having to bend down and position the support arm by hand. This lifting cord 14 will enable the operator to lift or raise the support arm from his or her operating position so as to avoid having to bend over or move around the mower to reach the support arm in order to lift it.

Figure 4:
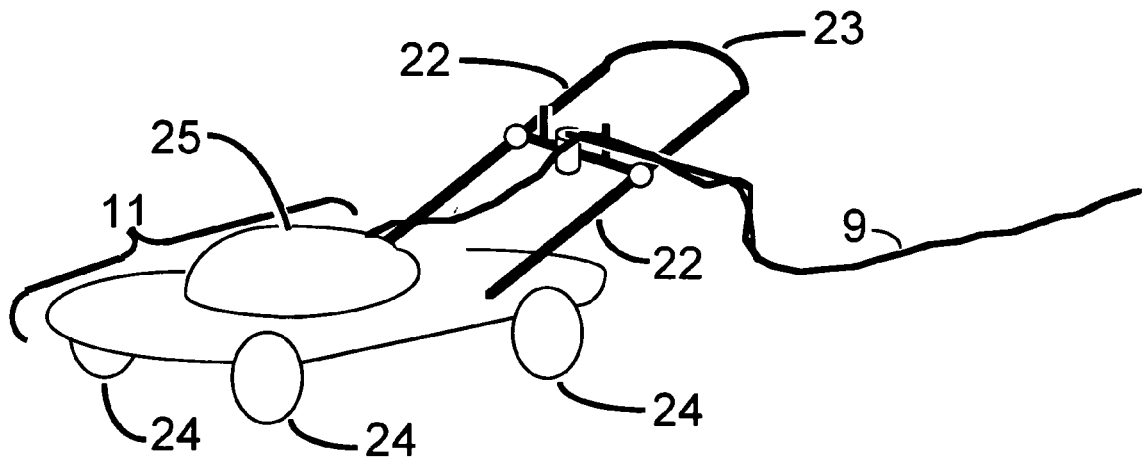
FIG. 4 depicts an alternate embodiment of the present invention.
Figure 5:
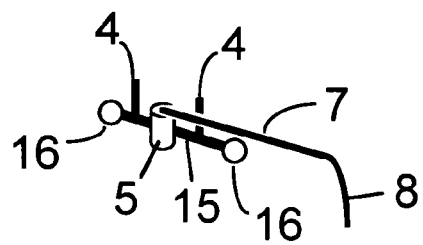
FIG. 5 depicts an alternate embodiment of the present invention that is mounted on an electric lawn mower.

A variation on the present invention would be to have the device mounted on the mower's push bar in one of many possible ways. FIGS. 4 and 5 depict an alternate embodiment of the present invention in which the device is assembled as a crossbar 15 mounted by mounting points 16 such that support arm 7 pivots about center support 5 which is mounted proximately to a point between the mower's push bars. Many other mounting means and locations will be evident in light of the present teaching. This variation has the advantage of simpler construction but may not pull the cord from a point close to the ground such that operator intervention may be occasionally required (but, in this case the cord is lifted such that the operator's hands are kept away from the mower blades).

In operation, the mower starts at one side of an area to be mowed and the cord is positioned to enter the area from that starting side. The support arm is positioned towards that starting side as well. The mower travels in a direction that is generally parallel to that starting side. When the end of travel is reached for a given cut path, the mower is pulled on a path of a backing u-turn (i.e., the push bar is pulled in a direction away from that starting side in a motion that causes the mower to be rotated 180° while positioning the mower on a path adjacent to and parallel to the path just cut). This new path should be overlapping slightly with the path just cut. The length of the support arm should be at least long enough that the tip of the drop portion will clear the front of the mower (including the wheels 24); this length can be an adjustable feature 21 of the device for holding the cord farther from the mower according to personal taste and the amount of overlap desired for adjacent cut paths.

In the preferred embodiment and variations thereon, the mounting points can be clamps, drilled and bolted, permanent or quick release attachments, or other means well known to those skilled in the art. The mower cord can be wrapped about the support arm 7 (and the optional down drop portion 8) or it can be held in place by clips 17, straps, tapes or other means well known to those skilled in the art. The cord and support arm will typically be constructed to pivot about the center support such that neither the arm nor the cord will rub on the crossbar or blocking posts or any other part that might induce premature wear of the device. The support arm and optional drop down will be constructed of wood, metal, plastic, fiberglass, carbon-fiber or other material that will withstand the force of the cord being dragged back behind the mower as will be well understood by those skilled in the art. The present invention can be part of an initial design (to which it can be permanently attached or removable) or it can be added to an existing platform 11.

The foregoing description of an example of the preferred embodiment of the invention and the variations thereon have been presented for the purposes of illustration and description. It is not intended to be exhaustive or to limit the invention to the precise forms disclosed. Many modifications and variations are possible in light of the above teaching. It is intended that the scope of the invention be limited not by this detailed description.

We claim:

1. A cord handling device comprising a movably mounted support arm that, when not disabled, will support a cord to the side of a platform such that the cord will not be suspended in the air behind the platform but will be made to come into contact with the ground at a point along side or proximate to either end of the platform while the platform is moving forward.

2. The cord handling device of claim 1 in which the platform is movable.

3. The cord handling device of claim 1 in which the platform comprises a grass cutting device.

4. The cord handling device of claim 1 further comprising attachment means to attach a power cord from the platform to the support arm.

5. The cord handling device of claim 1 further comprising means to attach the device to said platform.

6. The cord handling device of claim 5 in which said means to attach comprises bolting.

7. The cord handling device of claim 5 in which said means to attach comprises clamping.

8. The cord handling device of claim 1 in which said support arm comprises means to adjust the length of said support arm.

9. The cord handling device of claim 1 comprising a device to enable an operator to raise the support arm.

10. The cord handling device to enable an operator to raise the support arm of claim 9 that enables the operator to raise said support arm while the operator is in the operating position.

11. The cord handling device of claim 1 comprising permanent attachment to the platform.

12. The cord handling device of claim 1 further comprising a blocking device to limit the range of rotational motion of the support arm.

13. The cord handling device of claim 12 whereby the blocking device to limit the range of rotational motion of the support arm comprises a post.

14. The cord handling device of claim 1 whereby said support arm can swing from one side of the platform to the other.

15. The cord handling device of claim 1 comprising means to disable the operation of the support arm by positioning the free end of the support arm over the platform.

16. The cord handling device of claim 1 said support arm further comprising an end portion that comes closer to the ground than the rest of the support arm.

17. The cord handling device of claim 16 whereby the support arm end portion's closeness to the ground can be adjusted manually.

18. The cord handling device of claim 16 whereby the support arm end portion's closeness to the ground adjusts automatically.

* * * * *